(12) United States Patent
Russinovich et al.

(10) Patent No.: US 12,093,433 B2
(45) Date of Patent: Sep. 17, 2024

(54) PROCESSOR WITH NETWORK STACK DOMAIN AND SYSTEM DOMAIN USING SEPARATE MEMORY REGIONS

(71) Applicant: Microsoft Technology Licensing, LLC, Redmond, WA (US)

(72) Inventors: Mark Russinovich, Hunts Point, WA (US); Galen Clyde Hunt, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/183,041

(22) Filed: Mar. 13, 2023

(65) Prior Publication Data

US 2023/0214535 A1 Jul. 6, 2023

Related U.S. Application Data

(63) Continuation of application No. 16/543,868, filed on Aug. 19, 2019, now Pat. No. 11,625,505.

(51) Int. Cl.
*G06F 21/71* (2013.01)
*G06F 9/54* (2006.01)
(Continued)

(52) U.S. Cl.
CPC .............. *G06F 21/74* (2013.01); *G06F 9/541* (2013.01); *G06F 21/44* (2013.01); *H04L 63/08* (2013.01);
(Continued)

(58) Field of Classification Search
CPC ... H04L 63/08; H04L 63/102; H04L 63/1416; G06F 9/45558; G06F 9/547; G06F 21/44; G06F 21/53; G06F 21/54; G06F 21/575; G06F 21/74; G06F 8/65; G06F 2221/033; G06F 2221/2149; G06F 9/54; H04W 4/70; H04W 12/12
See application file for complete search history.

(56) References Cited

U.S. PATENT DOCUMENTS

| | | | |
|---|---|---|---|
| 2004/0024953 A1* | 2/2004 | Babaian | G06F 12/109 711/6 |
| 2004/0054988 A1* | 3/2004 | Atallah | G06F 8/71 717/122 |

(Continued)

OTHER PUBLICATIONS

U.S. Appl. No. 16/543,868, filed Aug. 19, 2019.
(Continued)

*Primary Examiner* — Tuan C Dao
(74) *Attorney, Agent, or Firm* — Workman Nydegger

(57) ABSTRACT

The disclosed technology is generally directed to network security for processors. In one example of the technology, a computing device includes: a processor, a memory, and a network interface. The computing device executes a first binary within a first region of the memory, executes a separate second binary within a second region of the memory, and prevents the second binary from accessing the first region of the memory. The first binary implements a kernel configured to control the network interface, while the separate second binary implements a network stack that is restricted to communicate only with an identified set of trusted servers.

20 Claims, 7 Drawing Sheets

(51) Int. Cl.
  *G06F 21/44* (2013.01)
  *G06F 21/74* (2013.01)
  *H04L 9/40* (2022.01)
  *G06F 8/65* (2018.01)
  *G06F 9/445* (2018.01)

(52) U.S. Cl.
  CPC .............. *H04L 63/102* (2013.01); *G06F 8/65* (2013.01); *G06F 9/445* (2013.01); *G06F 2221/033* (2013.01); *G06F 2221/2149* (2013.01)

(56) References Cited

U.S. PATENT DOCUMENTS

| | | | | |
|---|---|---|---|---|
| 2004/0196843 A1* | 10/2004 | Zinin | ............ | H04L 41/00 370/389 |
| 2005/0076299 A1* | 4/2005 | Simpson | ............ | G06F 3/1204 715/274 |
| 2005/0238034 A1* | 10/2005 | Gillespie | ............ | H04L 67/14 713/150 |
| 2005/0278399 A1* | 12/2005 | Herle | ............ | G06F 8/658 708/100 |
| 2007/0254630 A1* | 11/2007 | Moloney | ............ | H04L 63/06 455/410 |
| 2009/0125633 A1* | 5/2009 | Watsen | ............ | H04L 63/029 709/229 |
| 2009/0193074 A1* | 7/2009 | Lee | ............ | H04L 63/12 709/229 |
| 2009/0222907 A1* | 9/2009 | Guichard | ............ | H04L 63/1408 726/17 |
| 2013/0104119 A1* | 4/2013 | Matsuo | ............ | G06F 8/65 717/173 |
| 2013/0268257 A1* | 10/2013 | Hu | ............ | G06F 11/3466 703/22 |
| 2014/0344832 A1* | 11/2014 | Kannan | ............ | G06F 21/52 719/313 |
| 2015/0007304 A1* | 1/2015 | Malka | ............ | G06F 21/54 726/17 |
| 2015/0089306 A1* | 3/2015 | Cardona | ............ | G06F 11/2046 714/54 |
| 2015/0172300 A1* | 6/2015 | Cochenour | ............ | G06F 21/6218 726/23 |
| 2016/0182531 A1* | 6/2016 | Rubakha | ............ | G06F 21/57 726/1 |
| 2016/0232291 A1* | 8/2016 | Kyriazopoulou-Panagiotopoulou | ............ | G16B 20/20 |
| 2016/0254964 A1* | 9/2016 | Benc | ............ | H04L 41/12 709/223 |
| 2017/0139777 A1* | 5/2017 | Gehrmann | ............ | G06F 21/575 |
| 2017/0177314 A1* | 6/2017 | Powers | ............ | G06F 8/41 |
| 2018/0054490 A1* | 2/2018 | Wadhwa | ............ | G08G 1/0129 |
| 2018/0191738 A1* | 7/2018 | David | ............ | H04W 12/128 |
| 2019/0007280 A1* | 1/2019 | Sarangam | ............ | H04L 43/026 |
| 2019/0014436 A1* | 1/2019 | Radmand | ............ | H04W 4/80 |
| 2019/0109713 A1* | 4/2019 | Clark | ............ | G06F 16/182 |
| 2021/0136111 A1 | 5/2021 | Russinovich et al. | | |

OTHER PUBLICATIONS

U.S. Appl. No. 16/671,543, filed Nov. 1, 2019.
Notice of Allowance Issued in U.S. Appl. No. 16/671,538, mailed on Feb. 4, 2022, 10 pages.

* cited by examiner

PROCESSOR WITH NETWORK STACK DOMAIN AND SYSTEM DOMAIN USING SEPARATE MEMORY REGIONS

CROSS-REFERENCE TO RELATED APPLICATIONS

This application is a continuation of U.S. patent application Ser. No. 16/543,868, filed Aug. 19, 2019, and entitled "PROCESSOR WITH NETWORK STACK DOMAIN AND SYSTEM DOMAIN USING SEPARATE MEMORY REGIONS," and which issued as U.S. Pat. No. 11,625,505 on Apr. 11, 2023, the entire contents of which are incorporated by reference herein in their entirety.

BACKGROUND

Billions of devices globally may be driven by some form of real-time operating system (RTOS) running on a microcontroller (MCU). This is because the combination of an RTOS and an MCU may enable the rapid development and deployment of complex device operation logic at very low hardware implementation cost. With the accelerating adoption of IoT, there may be significant pressure to build cloud-connected versions of these devices.

With the two-way connectivity required for device-to-cloud communication may come the risk of remote attacks against these devices over the network. The most dangerous form of attacks enabled by connectivity may be those in which a remote attacker gains control of the device. In its simplest form, the attacker may send one or more network packets to the device that exploit a security vulnerability, thus allowing the attacker through one or more steps to ultimately control the execution of code on the device. Remote attacks may range from those in which the attacker loads their own code onto the device to those in which the attacker takes control using existing code on the device, such as through a return-oriented programming (ROP) attack.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to network security for processors. In one example of the technology, a device includes: hardware, including a network interface; a memory; and a processor. In some examples, the memory is adapted to store run-time data for the device. In some examples, the memory includes at least a first memory region and a second memory region. In some examples, the processor is adapted to execute processor-executable code including a first binary in the first memory region and a second binary in the second memory region. In some examples, the first binary includes at least one application and a kernel. In some examples, the kernel is configured to control the hardware. In some examples, the second binary is configured to operate, upon execution, as a network stack. In some examples, the device is configured such that the first memory region is protected such that the first memory region is inaccessible to the second binary.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
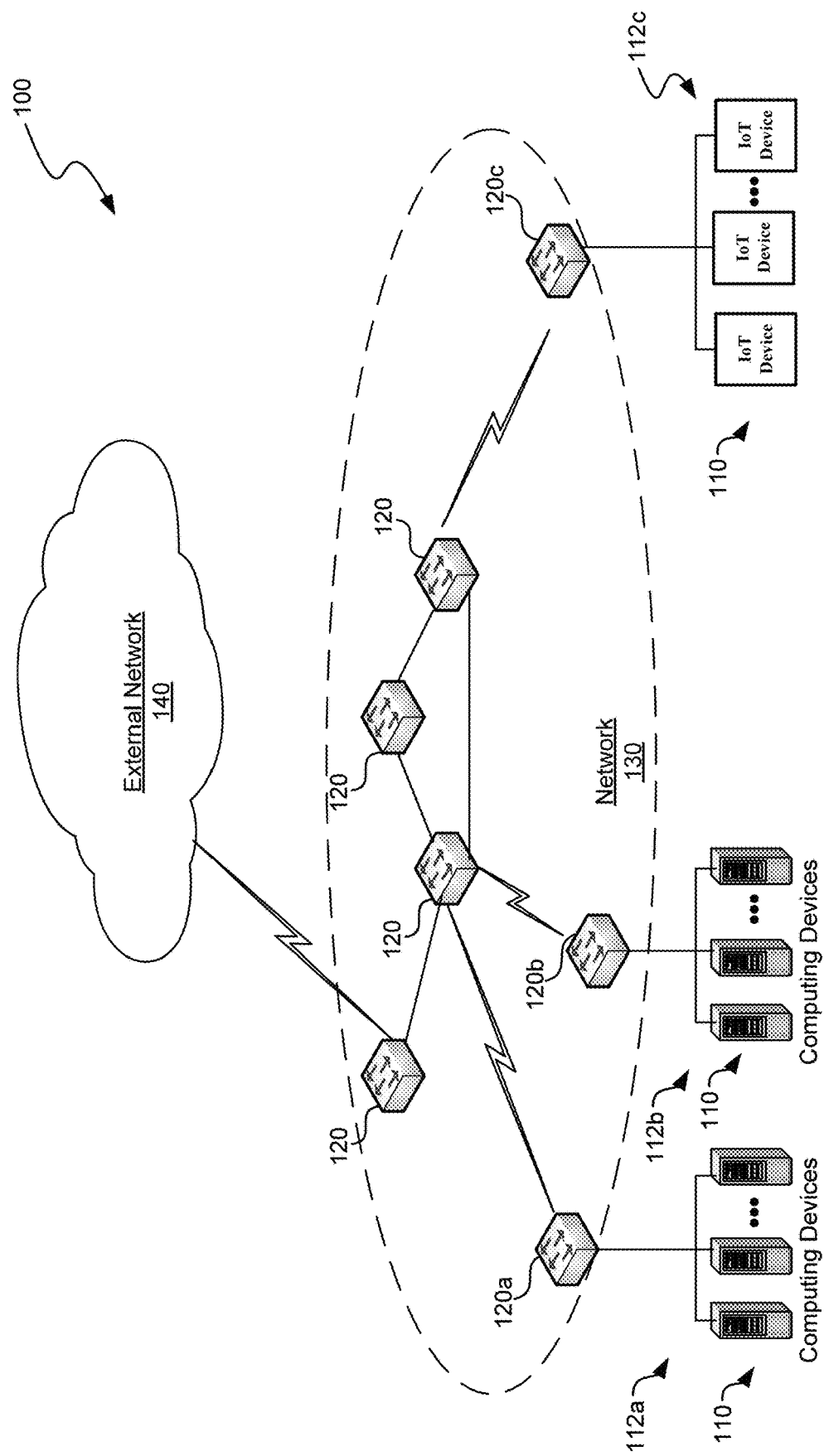
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to network security for processors. In one example of the technology, a device includes: hardware, including a network interface; a memory; and a processor. In some examples, the memory is adapted to store run-time data for the device. In some examples, the memory includes at least a first memory region and a second memory region. In some examples, the processor is adapted to execute processor-executable code including a first binary in the first memory region and a second binary in the second memory region. In some examples, the first binary includes at least one application and a kernel. In some examples, the kernel is configured to control the hardware. In some examples, the second binary is configured to operate, upon execution, as a network stack. In some examples, the device is configured such that the first memory region is protected such that the first memory region is inaccessible to the second binary.

Software for a microcontroller (MCU) may be designed for network security as follows. The kernel and one or more application may run in one binary, running in one execution domain, with the network stack running in a separate binary, running in a separate execution domain, with the network stack unable to access the domain in which the kernel and application are running.

The networking stack may provide the entire network processing stack for a scenario, Open System Interconnect (OSI) layers 3 through 7. The networking stack may further provide OSI layers 3 through 7, isolated into in a single binary that is loaded into a separate execution domain, with a binary that has been hardened, tested, and validated using established best practices for security engineering. The scope of network-based attacks may be reduced by the fact that the network stack is running in a separate execution domain from the system execution domain. By distributing the network stack binary as a fully serviced binary that self-updates automatically to the latest version available from the networking stack provider, emerging security threats may be addressed.

Illustrative Devices/Operating Environments

FIG. 1 is a diagram of environment 100 in which aspects of the technology may be practiced. As shown, environment 100 includes computing devices 110, as well as network nodes 120, connected via network 130. As shown, some of the computing devices 110 may include IoT devices. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively. Network nodes 120a-120c can then be operatively coupled to additional network nodes 120 to form a computer network in a suitable type of topology that allows communications between computing devices 110 and external network 140. In other examples, multiple host sets 112a-112c may share a single network node 120. Computing devices 110 may be virtually any type of general- or specific-purpose computing device.

Some of the computing devices 110 may include IoT devices, which may include everyday objects such as toasters, coffee machines, thermostat systems, washers, dryers, lamps, automobiles, and the like. IoT devices may also include, for example, a variety of devices in a "smart" building including lights, temperature sensors, humidity sensors, occupancy sensors, and the like. In some examples, one or more of the computing devices 110 is an IoT device, a device that comprises part or all of an IoT support service, a device comprising part or all of an application back-end, a device comprising part or all of a server, or the like, as discussed in greater detail below. The IoT services for the IoT devices can be used for device automation, data capture, providing alerts, personalization of settings, and numerous other applications. Some of these computing devices may be user devices such as desktop computers, laptop computers, tablet computers, display devices, cameras, printers, or smartphones, which may be used, in some examples, to communicate with a device portal provided by the application back-end.

Illustrative Computing Device

Figure 2:
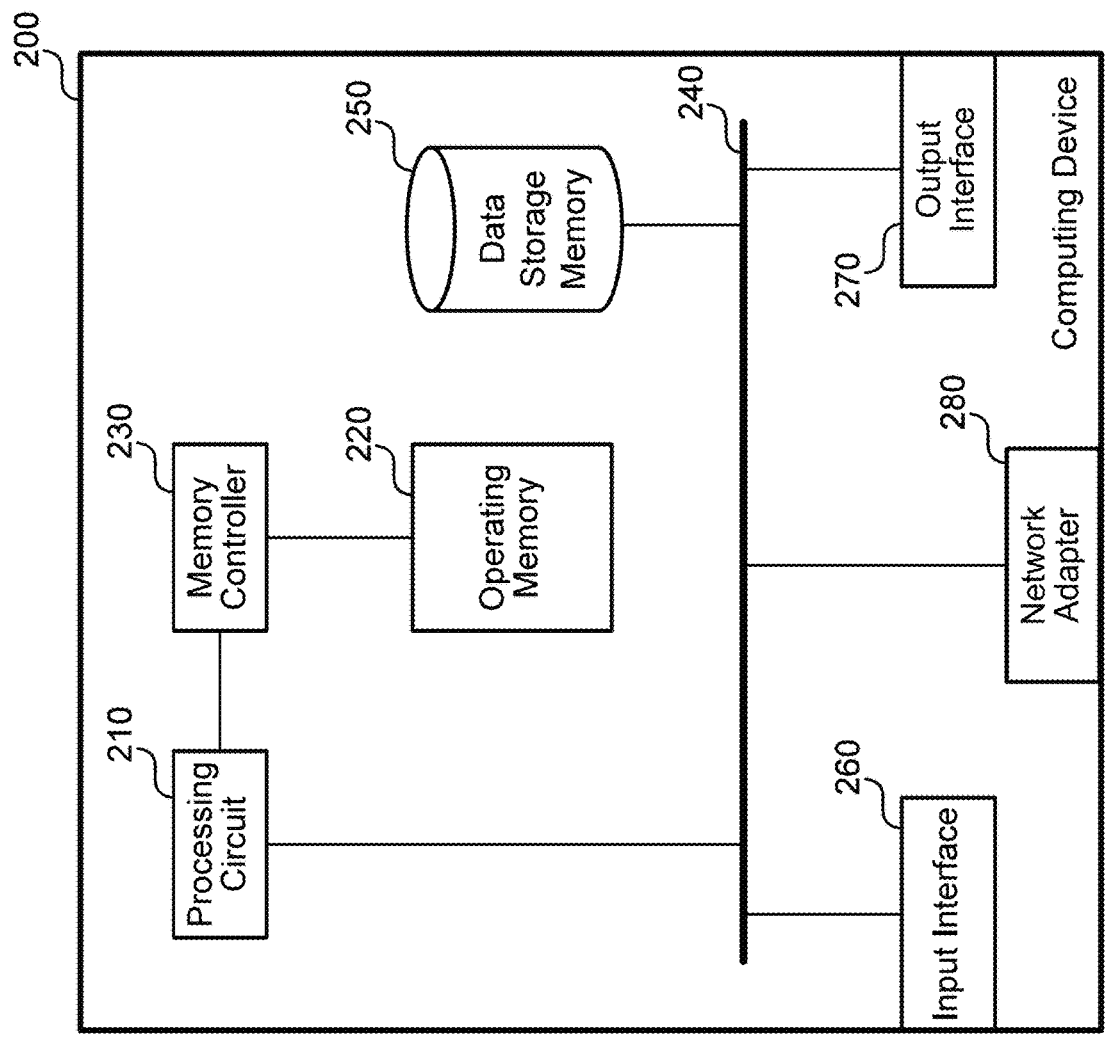
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Such a device may be used, in some examples, to communicate with a device portal provided by the application back-end. Likewise, computing device 200 may also be server device such as an application server computer, a virtual computing host computer, or a file server computer, e.g., computing device 200 may be an example of computing device 110 or network node 120 of FIG. 1, or other service-side device such as a device used within IoT services, an application back-end, or the like. Computing device 200 may also be an IoT device that connects to a network to receive IoT services. Likewise, computer device 200 may be an example any of the devices illustrated in or referred to in FIGS. 3-4, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include $4^{th}$ generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. Such components may be included, for example, in a client device that communicates with an application back-end via a device portal. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions, such of the action of the process of FIG. 7 below in some examples.

Illustrative Systems

Figure 3:
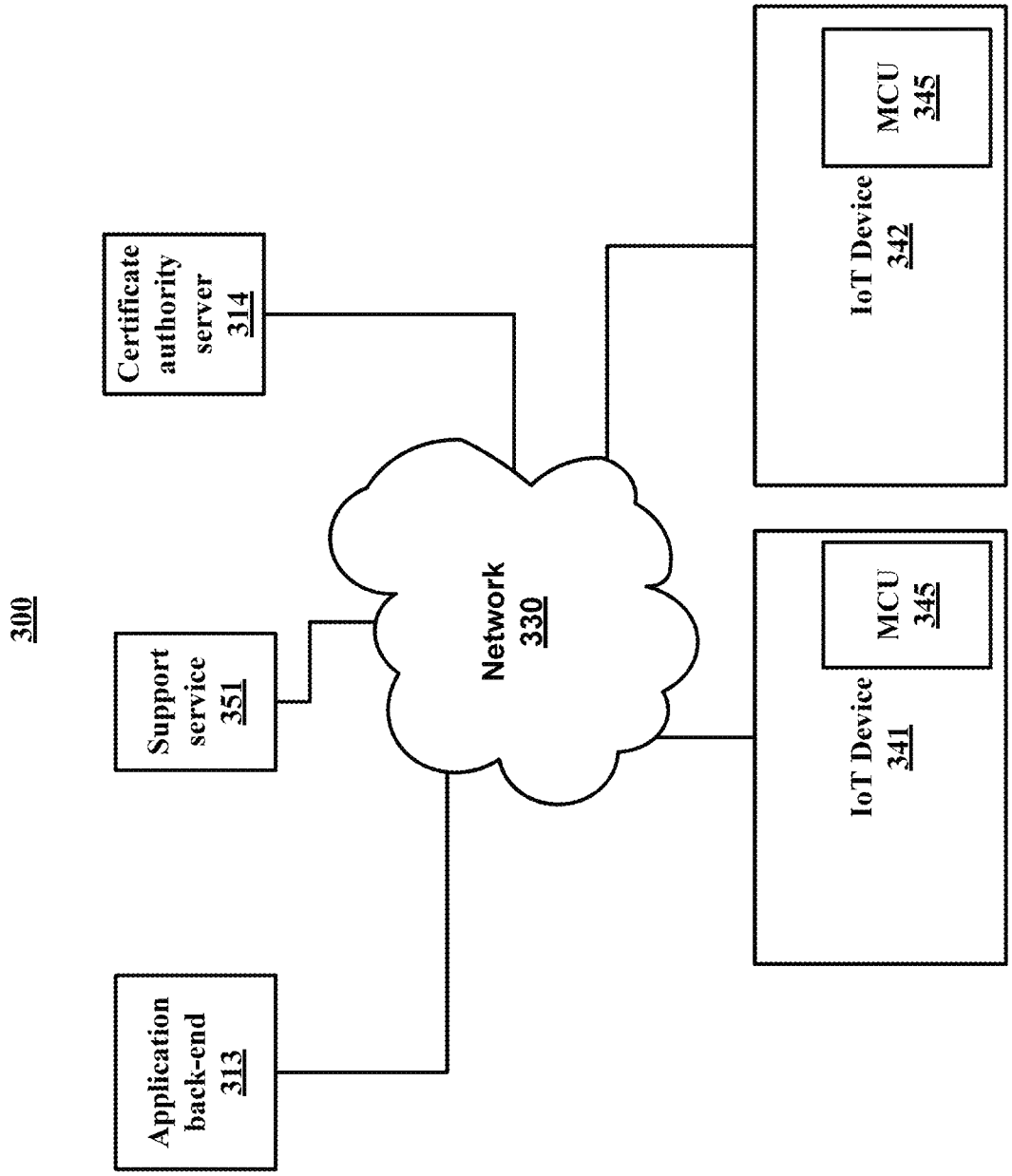
FIG. 3 is a block diagram illustrating an example of a system.

FIG. 3 is a block diagram illustrating an example of a system (300). System 300 may include network 330, as well as support service 351, IoT devices 341 and 342, application back-end 313, and certificate authority server 314, which all connect to network 330. The term "IoT device" refers to a device intended to make use of IoT services. An IoT device can include virtually any device that connects to the cloud to use IoT services, including for telemetry collection or any other purpose. IoT devices include any devices that can connect to a network to make use of IoT services. IoT devices can include everyday objects such as toasters, coffee machines, thermostat systems, washers, dryers, lamps, automobiles, and the like. IoT devices may also include, for example, a variety of devices in a "smart" building including lights, temperature sensors, humidity sensors, occupancy sensors, and the like. The IoT services for the IoT devices can be used for device automation, data capture, providing alerts, personalization of settings, and numerous other applications.

Application back-end 313 refers to a device, or multiple devices such as a distributed system, that performs actions that enable data collection, storage, and/or actions to be taken based on the IoT data, including user access and control, data analysis, data display, control of data storage, automatic actions taken based on the IoT data, and/or the like. In other examples, system 300 is used for functions other than IoT, in which application back-end 313 may perform other suitable corresponding functions. In some examples, at least some of the actions taken by the application back-end may be performed by applications running in application back-end 313.

In some examples, support service 351 includes a security service for microcontrollers (MCUs) 345. In some examples, support service 351 also includes an IoT support service. The term "IoT support service" refers to a device, or multiple devices such as a distributed system, to which, in some examples, IoT devices connect on the network for IoT services. In some examples, the IoT support service is an IoT hub. In some examples, the IoT hub is excluded, and IoT devices communicate with an application back-end, directly or through one or more intermediaries, without including an IoT hub, and a software component in the application back-end operates as the IoT support service. IoT devices receive IoT services via communication with the IoT support service.

Each of the IoT devices 341 and 342, and/or the devices that comprise support service 351 and/or application back-end 313 may include examples of computing device 200 of FIG. 2. In some examples, support service 351 includes an IoT support service. The term "IoT support service" is not limited to one particular type of IoT service, but refers to the device to which the IoT device communicates, after provisioning, for at least one IoT solution or IoT service. That is, the term "IoT support service," as used throughout the specification and the claims, is generic to any IoT solution. The term IoT support service simply refers to the portion of the IoT solution/1° T service to which provisioned IoT devices communicate. In some examples, communication between IoT devices and one or more application back-ends occur with an IoT support service as an intermediary. In some examples, the IoT support service is in the cloud, whereas the IoT devices are edge devices. FIG. 3 and the corresponding description of FIG. 3 in the specification illustrates an example system for illustrative purposes that does not limit the scope of the disclosure.

In some examples, one or more of the IoT devices 341 and 342 includes microcontroller 345. Each microcontroller 345 may include a system binary and networking stack as a separate binary from the system binary, with the system binary and networking stack executing in separate memory regions, with the networking stack incapable of accessing the memory region in which the system binary is operating.

In some examples, certificate authority service 314 is arranged to manage certificates associated with one or more network authorizations that may be used for network authorization associated with networking authorization functions performed by the networking stack binary in MCU 345.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 330 includes any communication method by which information may travel between support service 351, IoT devices 341 and 342, application back-end 313, and certificate authority server 314. Although each device or service is shown connected as connected to network 330, that does not mean that each device communicates with each other device shown. In some examples, some devices/services shown only communicate with some other devices/services shown via one or more intermediary devices. Also, other network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

As one example, IoT devices 341 and 342 are devices that are intended to make use of IoT services provided by the IoT support service, which, in some examples, includes one or more IoT support services that are included in support service 351. Application back-end 313 may include a device or multiple devices that perform actions in providing a device portal to users of IoT devices.

In other examples, devices 341 and 342 are not IoT devices, but are instead other suitable devices that include a microcontroller 345 or other processor device.

System 300 may include more or less devices than illustrated in FIG. 3, which is shown by way of example only.

Figure 4:
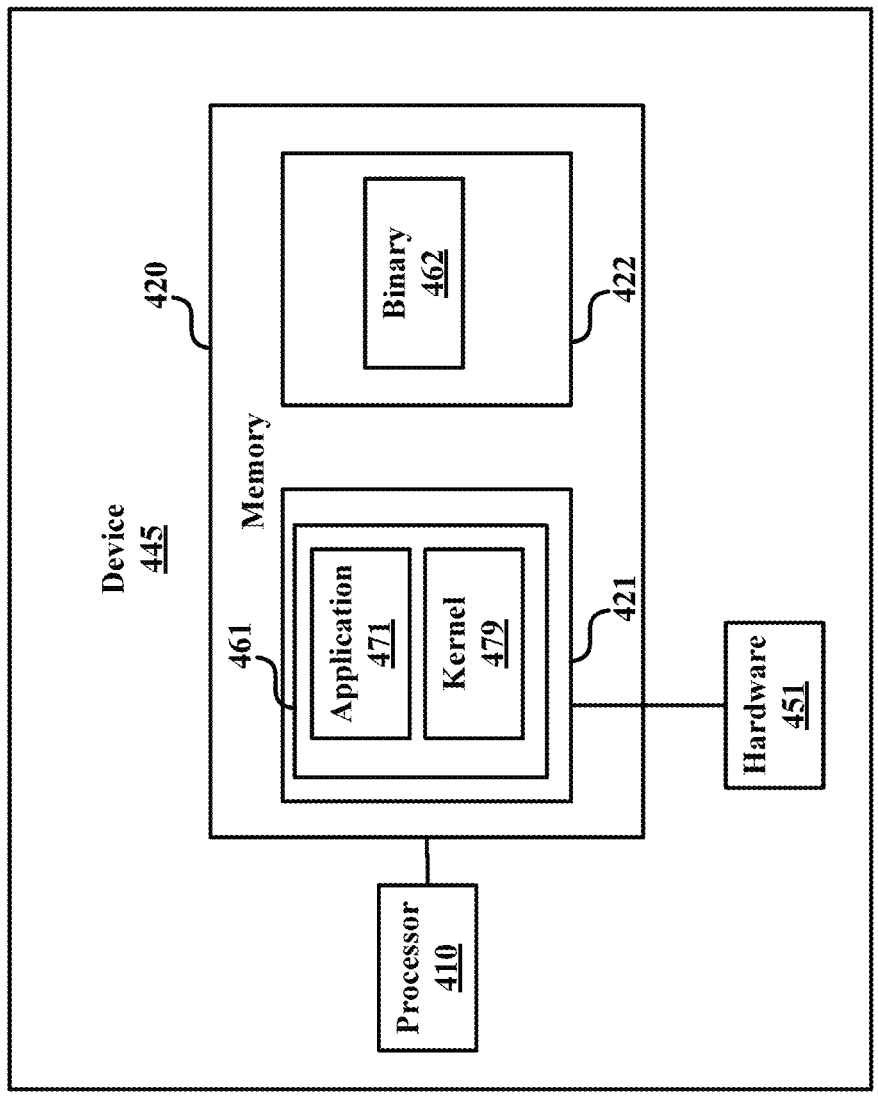
FIG. 4 is a block diagram illustrating an example of a device.

FIG. 4 is a block diagram illustrating an example of device 445. Device 445 may include: hardware 451; memory 420; and processor 410. In some examples, memory 420 is adapted to store run-time data for device 445.

In some examples, memory 420 includes at least first memory region 421 and second memory region 422. In some examples, processor 410 is adapted to execute processor-executable code including first binary 461 in first memory region 421 and second binary 462 in second memory region 422. In some examples, first binary 461 includes at least one kernel 479 and at least one application 471. In some examples, kernel 479 is configured to control hardware 451. In some examples, second binary 462 is configured to operate, upon execution, as a network stack. In some examples, device 445 is configured such that first memory region 421 is protected such that first memory region 421 is inaccessible to second binary 422.

In some examples, device 445 is a microcontroller, and kernel 479 includes a real-time operating system (RTOS). In some examples, first memory region 421 is protected by a memory protection unit (MPU) (not shown in FIG. 4). In some examples, first binary 461 is a system binary that includes kernel 479 and at least one application 471, and second binary 462 is a networking stack as a separate binary.

In some examples, use of second binary 462 a separate networking binary allows reuse of testing and servicing of the networking code, the code most at risk of containing vulnerabilities targeted by remote attackers. The implementation for creating and loading a separate networking binary may vary in different examples, and may depend on, for example, the RTOS used by kernel 479 in examples in which an RTOS is used. In one example, the implementation for creating and loading a separate networking binary may be accomplished by granting execution permissions to a separate byte-addressable area of flash memory. In another example, the implementation may be accomplished by streaming the binary through a hardware interface into RAM, updating page permissions to the RAM, and relocating the binary for a new base address.

In some examples, code in first binary 461 receives incoming network packets from hardware 451 and delivers the incoming network packets to networking binary 462, and also receives outgoing network packets from networking binary 462 and delivers the outgoing network packets to hardware 451 (such as a network interface in hardware 451, in some examples).

In some examples, networking binary 462 loads into its own execution domain. The separate execution domain may be constructed using a fully isolated address space on examples in which device 445 includes a processor with an MMU or, in other examples, using the simpler region protections and privilege levels of an MPU.

Figure 5:
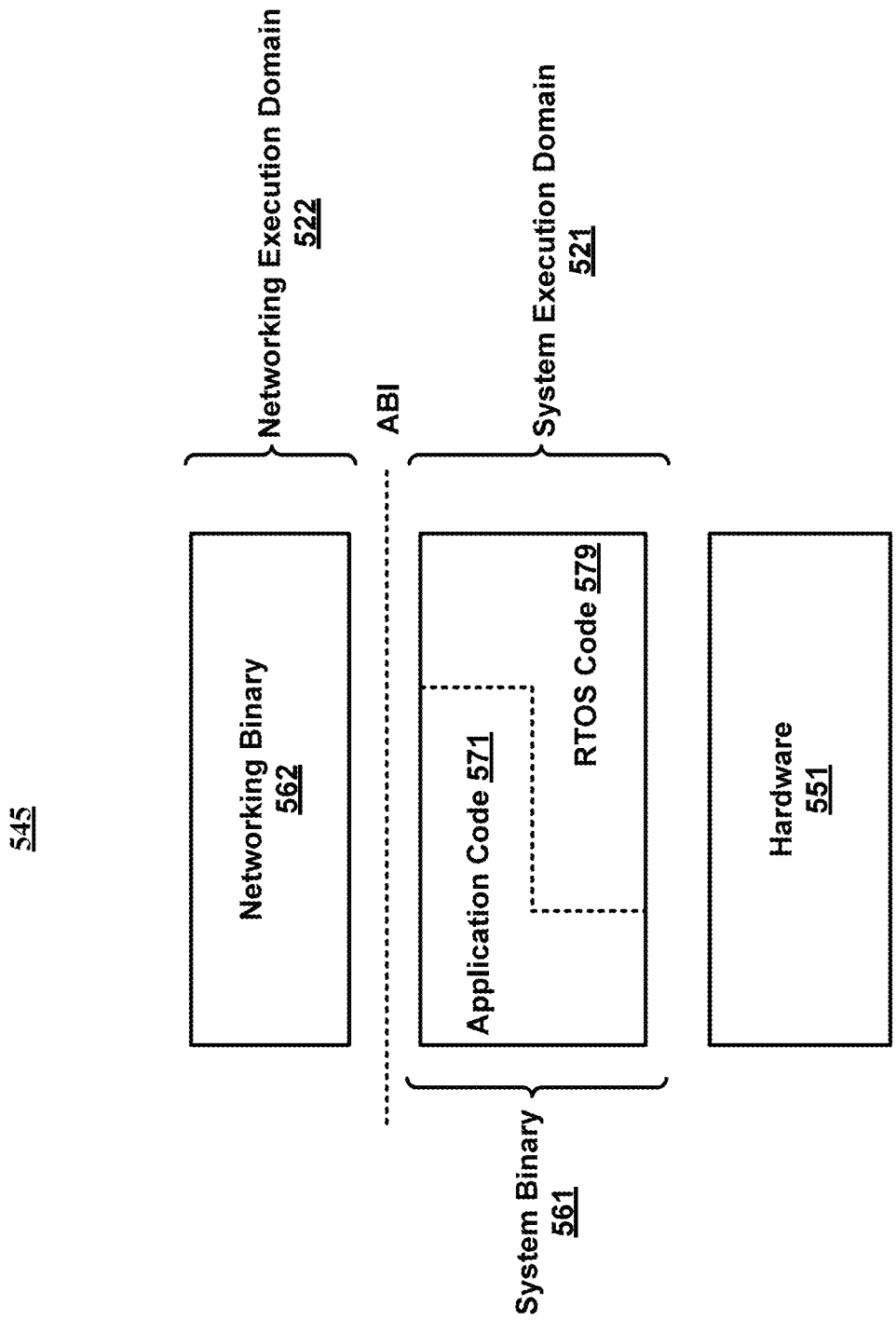
FIG. 5 is a block diagram illustrating an example software architecture of a microcontroller.

FIG. 5 is a block diagram illustrating an example software architecture of a microcontroller 545 with an isolated networking stack. Microcontroller 545 may include hardware 551, system execution environment 521, and network execution environment 522. In some examples, system binary 561 is configured to execute in system execution domain 541, and networking binary 562 is configured to execute in networking execution domain 522. System binary 561 may include application code 571 and RTOS code 579. Hardware 551 may include a network interface (not shown in FIG. 5).

In some examples, application code 571 and RTOS code 579 operate as a single system binary 561. In some examples, networking binary 562 operates in a separate execution domain, namely networking execution domain 542, from the execution domain (system execution domain 541) in which system binary 561 operates. In some examples, microcontroller 545 further includes an MPU (not show in FIG. 5) that prevents networking binary 562 from accessing system execution domain 541. In some examples, system binary 561 and networking binary 562 communicate only via a defined interface. In some examples, the defined interface is an application-binary interface (ABI).

In some examples, code in system binary 561, such either RTOS code 579 or application code 571, receives incoming network packets from hardware 556, and delivers the incoming network packets to networking binary 562, and also receives outgoing network packets from networking binary 562 and delivers the outgoing network packets to hardware 551. In some examples, networking binary 562 performs all other network functions for microcontroller 545.

In some examples, the interface between system binary 561 and networking binary 562 consists of the Layer 2 to Layer 3 network packet interface and the interface for the application to interact with the Layer 7 networking code. For instance, for an example networking binary 562 implementing the Hypertext Transfer Protocol Secure (HTTPS) server protocol, networking binary 562 receives incoming packets from system binary 561 via the interface, authenticates the Transport Layer Security (TLS) connection, parses HTTP headers, asks for a resource from application code 571 in system binary 562 through the interface, and gives outgoing packets to system binary 562 through the interface.

Figure 6:
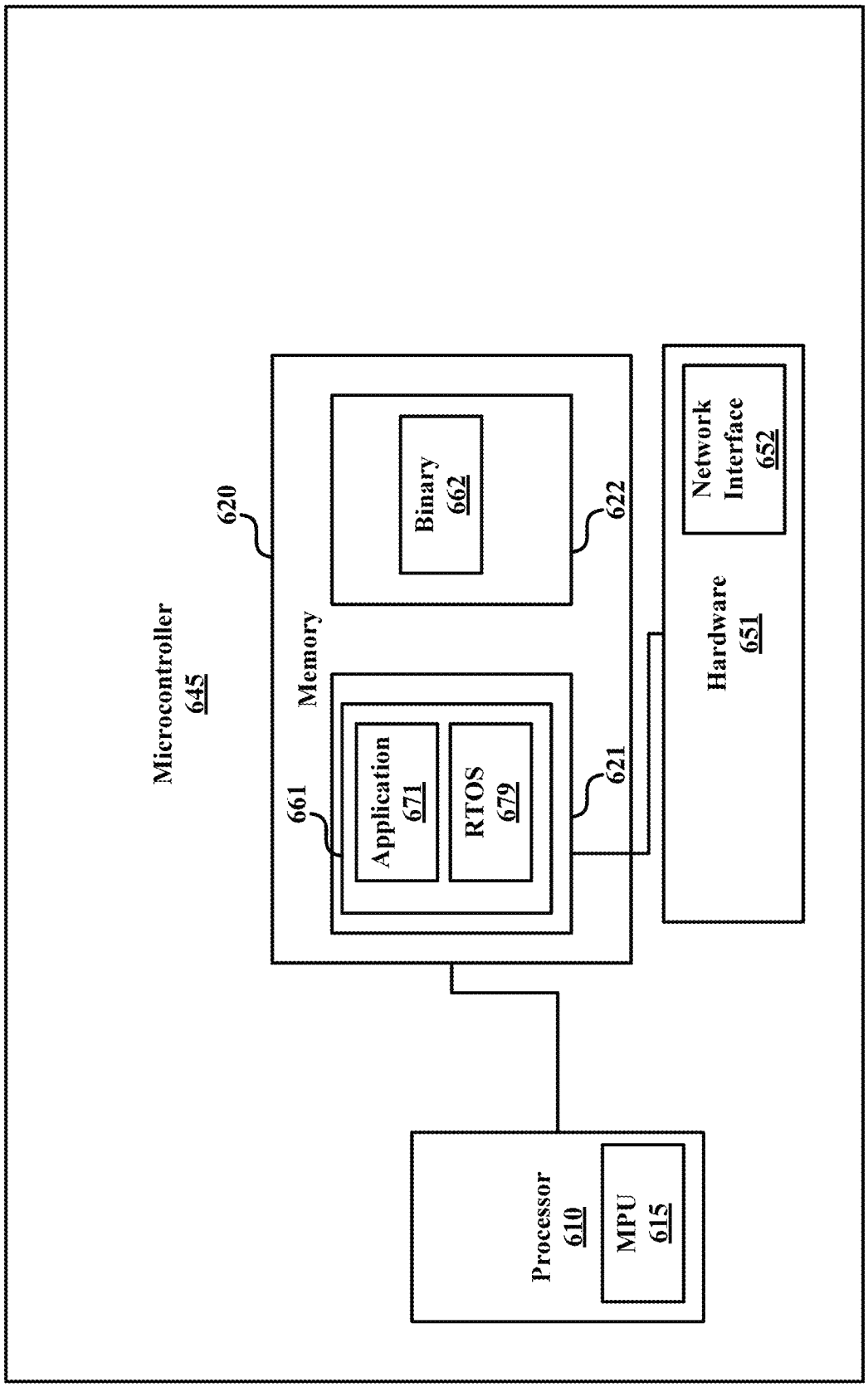
FIG. 6 is a block diagram illustrating an example of the microcontroller of FIG. 5.

FIG. 6 is a block diagram illustrating an example of microcontroller 645, which may be employed as an example of microcontroller 545 of FIG. 5. Microcontroller 645 may include processor 610, memory 620, and hardware 651. Processor 610 may include MPU 615. Hardware 651 may include network interface 652. Network interface 652 may be a network interface card or the like. Memory 620 may include system memory region 621 and networking memory region 622. In some examples, processor 610 is adapted to execute processor-executable code including a system binary 661 in system memory region 621 and networking binary 662 in networking memory region 622. In some examples, system binary 661 includes application code 671 and RTOS code 679. In some examples, kernel 679 is configured to control hardware 651. In some examples, networking binary 662 is configured to operate, upon execution, as a network stack. In some examples, device 645 is configured such that system memory region 621 is protected such that system memory region 621 is inaccessible to networking binary 622.

In some examples, application code 671 and RTOS code 679 operate as a single system binary 661. In some examples, networking binary 662 operates in a separate execution domain (namely networking execution domain 642) from the execution domain (system execution domain 641) in which system binary 661 operates. In some examples, MPU 615 is configured to prevent networking binary 662 from accessing system execution domain 641. In some examples, system binary 661 and networking binary 662 communicate only via a defined interface.

In some examples, RTOS code 679 controls hardware 651, including network interface 652. In some examples, RTOS code 679 receives incoming network packets from network interface 652, and delivers the incoming network packets to networking binary 662, and also receives outgoing network packets from networking binary 662 and delivers the outgoing network packets to network interface 652. In some examples, all other networking functions, including all the way up through OSI Layer 7, are performed by networking binary 662. In some examples, OSI Layer 1 functionality is performed by network interface 615, which physically receives and sends network communication, RTOS code 679 performs low-level Layer 2 communication in receiving incoming network packets from network interface 652 and delivering the incoming network packets to networking binary 662 and also receiving outgoing network packets from networking binary 662 and delivering the outgoing network packets to network interface 652. In some examples, networking binary 662 performs the entire networking processing stack, OSI layer 3 through 7, and possibly some OSI level 2 functions as well.

In some examples, networking binary 652 acts as the entire network processing stack for a scenario, including all functionality for OSI Layers 3 through 7, as a single binary, a binary that has been hardened, tested, and validated using established best practices for security engineering. In this way, in some examples, the likelihood of vulnerability in the networking processing code is reduced. In some examples, the scope of attacks to microcontroller 645 may also be reduced by the fact that networking binary 662 is run in a separate execution domain from the system execution domain.

Further, in some examples, networking binary 662 is distributed as a fully serviced binary that self-updates automatically to the latest version available from the networking stack provider to address emerging security threats. In some examples, this may reduce the effect of attacks in microcontroller 545.

In some examples, networking binary 662 is restricted to communicate only with a white list of trusted servers over secured protocols. By restricting networking binary 662 to communicate only with a white list of trusted servers, the number of computers from which an attacker can launch an attack may be minimized. For example, a networking binary 662 for an IoT device may be programmed to communicate only with particular IoT Hub services. To avoid hard-coding addresses, trusted servers may be identified and authenticated using authenticating protocols, such as TLS. In these examples, the communication white list identifies the certificates of the trusted IoT Hub services.

Network-based authentication is typically applied at Layer 5 or higher in the OSI stack. Because of this, in some examples, layers at or below the protocol layer that implements authentication are hardened against attackers. For instance, in some examples, in an HTTPS networking stack, server authentication occurs within the TLS protocol. As a result, in these examples, the Internet Protocol (IP), TCP, and TLS layers (OSI Layers 3, 4, and 5 respectively) are each hardened against incoming packets sent by attackers.

In some examples, by using networking binary 662 as a separate networking binary, reuse of testing and servicing of the networking code, the code most at risk of containing vulnerabilities targeted by remote attackers, is allowed. In some examples, networking binary 662 contains all networking code, OSI Layers 3 through 7, for microcontroller 655. In some examples, this includes not only the code to implement the network and transport layers (OS Layers 3 and 4), but also the session, presentation, and application layers (OS Layers 5, 6, and 7).

In various examples, the implementation for creating and loading a separate networking binary 662 may vary. In some examples, for instance, the implementation for creating and loading a separate networking binary 662 may vary depending on the RTOS. In some examples, creating and loading a separate networking binary 662 is accomplished by granting execution permissions to a separate byte-addressable area of memory 622 in memory 610.

In some examples, RTOS code 679 performs the specific low-level OSI Layer 2 functions of receiving incoming network packets from network interface 652 and delivering the incoming network packets to networking binary 662, and receiving outgoing network packets from networking binary 662 and delivering the outgoing networking packets to network interface 652. In some examples, these OSI Layer 2 functions are placed in RTOS code 679 because these OSI Layer 2 functions are hardware-dependent. In some examples, these OSI Layer 2 functions are a safe to place in system binary 661 because these OSI Layer 2 functions are the easier part of the networking stack to harden, because these OSI Layer 2 functions deal with fixed-sized buffers and the simple semantics of sending and receiving packets through hardware.

In some examples, security engineering best practices in coding and testing are be applied to the entire networking stack, with emphasis on the layers that must be hardened against incoming packets from attackers. In some examples, engineering best practices are applied to the networking stack, where these engineering best practices include, but are not limited to, Security Development Lifecycle (SDL) threat modeling, code reviews, penetration testing, red-team exercises, and white-box fuzz testing using a system such as a security risk detection to systematically reach critical program locations.

In some examples, in order to protect against the threat of a remote attacker exploiting a vulnerability in networking binary 662 to compromise the entire system, networking binary 662 is loaded into its own execution domain, network memory region 622. In some examples, the separate execution domain may be constructed using the region protections and privilege levels of MPU 615.

In some examples, communication between system binary 661 and networking binary 662 is accomplishing only via an application-binary interface (ABI). In some examples, the ABI between system binary 661 and networking binary 662 consists of the Layer 2 to Layer 3 network packet interface and the interface for the application 671 to interact with the Layer 7 networking code. For instance, for an example networking binary 662 implementing the HTTPS server protocol, networking binary 662 receives incoming packets from system binary 661 via the ABI, authenticates the TLS connection, parses HTTP headers, asks for a resource from application code 671 in system binary 661 through the ABI, and gives outgoing packets to system binary 661 through the ABI.

In some examples, RTOS code 679 validates ABI parameters and monitors execution within networking execution domain 622. In the case of a failure or other error, in some examples, RTOS code 679 can reset networking execution domain 622 and reload networking binary 661.

Some examples of microcontroller 645 use automatic update for network binary 662. Automatic update may be especially important when an exploit against a vulnerability has been weaponized and is in circulation. In some examples, networking binary 662 is distributed as a separate binary and contains code for contacting the networking binary provider, downloading the latest edition of networking binary 662, and for validating the authenticity of the downloaded latest edition. In some examples, from the perspective of the hosting system binary 661, this is implemented with the addition of a small number of additional functions in the ABI, including the functions for saving an updated networking binary to the storage from which system binary 661 will load it the updated networking binary on the next restart.

In some examples, isolating the entire networking stack, Layers 3 through 7, into a separate binary, networking binary 662, that is loaded in a separate execution domain, network memory region 622, provides three critical benefits, as follows in these examples. First, it minimizes the networking code in system binary 661 to a small set of operations that are easily hardened: the hardware-specific Layer 2 networking functions of ingoing and outgoing email packets between networking binary 662 and network interface 652. Second, it creates a networking binary 662 that can be revised and tested in isolation by the networking stack provider against newly discovered security vulnerabilities and emerging security threats. Third, it allows the networking stack provider to service and update networking binary 662 unilaterally, thus providing the rapid turnaround required to address zero-day exploits.

As discussed above, in some examples, networking binary 662 provides all of the networking stack in OSI Layer 3-7, and possibly some Layer 2 functions. In some examples, networking stack 662 is configured to be able to communicate using network communications such as TCP/IP, perform authentication (such as with a certificate), and also perform application-specific functions in OSI layers 5-7. As one simple example, networking binary 662 may provide an interface for a binary function, such as an interface for pushing an on-off button.

In some examples, networking binary 662 may perform, in terms of application-specific functions, nothing more than an on-off switch. In some examples, networking binary 662 may perform, in terms of application-specific functions, one or more on-off switches, and one or more sliders, for example providing an 8-bit value from 0 to 255, or the like. In various examples, networking binary 662 may provide an interface for, in terms of application-specific functions, one or more pieces of data, each of which could be a value of one or more bits, a string, or other type of data.

In some examples, networking binary 662 may include a networking stack specific to a class of applications, that is reused across many applications, enabling economy of scale. For instance, in one examples, dishwashers and washing machines all use the same networking stack. As another example, a particular networking stack may include one on-off stack, and four radio dials that have a value from 0 to 255. For this example networking stack, the networking stack could be used for a radio, with the on-off stack being used to turn the radio on and off, one slider for tuning the station, and another slider for the volume level. For this example networking stack, the same networking stack could be used for a microwave oven, with one of the sliders used for how much power to use while cooking, and another of the sliders used for how much time the microwave oven will run. In some examples, some sliders may be ignored in some applications.

In some examples, the application-specific network functions can use https. In some examples, a user could communicate with the networking staff via a web browser. Other suitable protocols may be used in various examples, such as Message Queuing Telemetry Transport (MQTT) as but one example.

In some examples, networking binary 662 performs all network functions at OSI layers 3-7, including application network functions at the high OSI layers 5-7, but even though the networking functions include application-layer networking functions, networking binary 662 performs only networking functions, with all non-networking functions performed by system binary 661. In some examples, only system binary 661 can communicate with hardware, including hardware 651 on microcontroller 645, and any other hardware on the device of which microcontroller 651 is a part, which may be an IoT device or other network-connected device, so to the extent that networking binary 662 communicates with the hardware, it does so only indirectly via communicating with system binary 661 through the ABI, and not directly.

In some examples, networking binary 662 may track one or more states associated with application code 671 on system binary 661, but does not actually have direct control of the hardware associated with the state. For example, networking binary 662 may track the state of a light as on or off, but when a command is received over the network to turn the light on or off, networking binary 662 may first check the current state of the light as the state is stored in networking binary 662, send a command if needed to application 671 over the ABI to change the state of the light, receive communication back from application 671 over the ABI, and then, if it was indicated from application 671 over the ABI that the status of the light has changed, update the state of the light as stored in networking binary 662. The networking stack may then communicate back, via outgoing network communications, that the light has successfully turned on.

In some examples, because networking binary 662 does not have direct access to hardware, some types of communication may be required with system binary 661 in order to perform certain functions. For instance, a TCP connection may require a periodic keep-alive ping in order to remain active. Accordingly, in some examples, networking binary 662 may request a small amount of periodic processing time from system binary 661, which networking binary 662 may use to determine whether a keep-alive ping should be sent.

Illustrative Process

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 7:
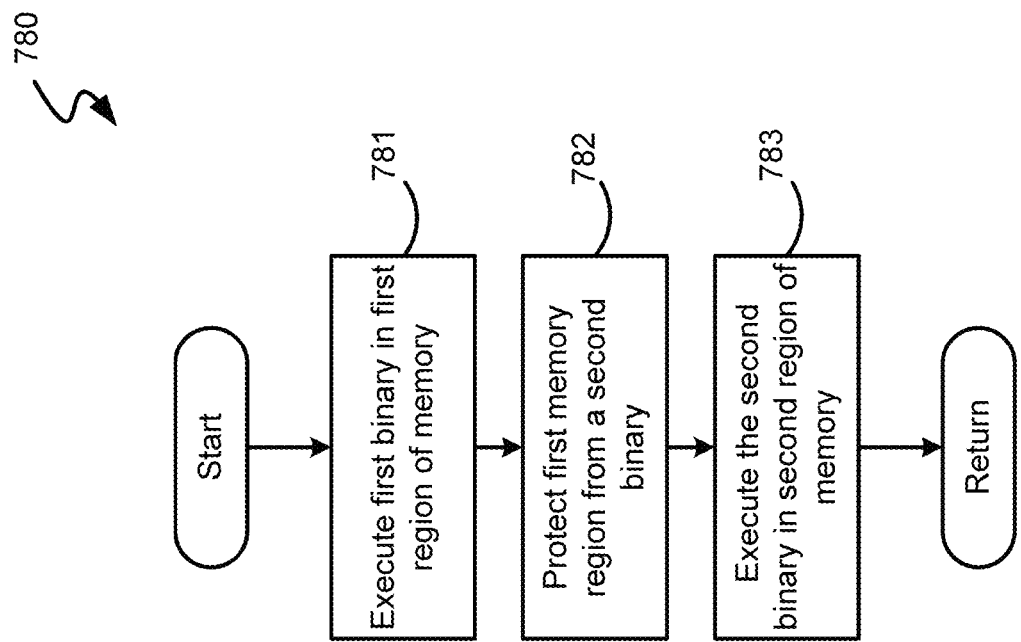
FIG. 7 is a flow diagram illustrating an example process, in accordance with aspects of the present disclosure.

FIG. 7 illustrates an example dataflow for a process (780) for network security for processors. In some examples, process 780 is performed by a device, such as device 200 of FIG. 2, or MCU 345 of FIG. 3, device 445 of FIG. 4, MCU 545 of FIG. 5, or MCU 645 of FIG. 6.

In the illustrated example, step 781 occurs first. At step 781, in some examples, a first binary is executed in the first memory region of a memory of a device. In some examples, the first binary includes at least one application and a kernel. In some examples, the kernel is configured to control hardware of the device. In some examples, the hardware includes a network interface. As shown, step 782 occurs next in some examples. At step 782, in some examples, the first memory region is protected such that the first memory region is inaccessible to a second binary. In some examples, the second binary is configured to operate, upon execution, as a network stack. As shown, step 783 occurs next in some examples. At step 783, in some examples, the second binary is executed in the second memory region of the memory of the device. The process may then proceed to the return block, where other processing is resumed.

Conclusion

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. A method, implemented at a computing device that includes a processor, a memory, and a network interface, comprising:
    executing a first binary within a first region of the memory, the first binary implementing,
        a kernel configured to control the network interface, and
        a first set of networking functions defined by open system interconnect (OSI) layer 1 and OSI layer 2;
    executing a second binary within a second region of the memory, the second binary being separate from the first binary and implementing,
        a network stack that is restricted to communicate only with an identified set of trusted servers, and
        a second set of networking functions defined by OSI layer 3, OSI layer 4, OSI layer 5, OSI layer 6, and OSI layer 7; and
    preventing the second binary from accessing the first region of the memory.

2. The method of claim 1, wherein:
    the set of trusted servers is identified based on certificate; and
    the network stack identifies a trusted server using a certificate-based authenticating protocol.

3. The method of claim 1, wherein one of a memory management unit (MMU) or a memory protection unit (MPU) protects the first region of the memory from the second region of the memory.

4. The method of claim 1, wherein executing the second binary within the second region of the memory includes one or more of:
    granting execution permissions to the second region of the memory; or
    locating the second binary into the memory, updating a memory page permission, and relocating the second binary to a base address within the second region of the memory.

5. The method of claim 1, wherein the first binary and the second binary communicate only through a defined interface.

6. The method of claim 5, wherein the defined interface comprises an OSI layer 2 interface, an OSI layer 3 interface, and an OSI layer 7 interface.

7. The method of claim 1, wherein the kernel includes a real-time operating system (RTOS).

8. The method of claim 1, wherein the computing device is an Internet of Things (IoT) device.

9. The method of claim 1, wherein the computing device is a microcontroller (MCU).

10. The method of claim 1, further comprising updating the second binary independently from the first binary.

11. A computing device, comprising:
    a processor;
    a memory;
    a network interface; and
    a processor-readable medium storing processor-readable instructions that are executable by the processor to at least:
        execute a first binary within a first region of the memory, the first binary implementing,
            a kernel configured to control the network interface, and
            a first set of networking functions defined by open system interconnect (OSI) layer 1 and OSI layer 2;
        execute a second binary within a second region of the memory, the second binary being separate from the first binary and implementing,
            a network stack that is restricted to communicate only with an identified set of trusted servers, and
            a second set of networking functions defined by OSI layer 3, OSI layer 4, OSI layer 5, OSI layer 6, and OSI layer 7;
        prevent the second binary from accessing the first region of the memory; and
        permit the first binary and the second binary to communicate only through a defined interface.

12. The computing device of claim 11, wherein the defined interface comprises an OSI layer 2 interface, an OSI layer 3 interface, and an OSI layer 7 interface.

13. The computing device of claim 11, wherein:
    the set of trusted servers is identified based on certificate; and
    the network stack identifies a trusted server using a certificate-based authenticating protocol.

14. The computing device of claim 11, wherein one of a memory management unit (MMU) or a memory protection unit (MPU) protects the first region of the memory from the second region of the memory.

15. The computing device of claim 11, wherein the kernel includes a real-time operating system (RTOS).

16. The computing device of claim 11, wherein the computing device is a microcontroller (MCU).

17. The computing device of claim 11, instructions that are executable by the processor to update the second binary independently from the first binary.

18. A processor-readable storage medium storing processor-readable instructions that are executable by a processor to cause a computing device to at least:
    execute a first binary within a first region of a memory, the first binary implementing,
        a kernel configured to control a network interface, and
        a first set of networking functions defined by open system interconnect (OSI) layer 1 and OSI layer 2;
    execute a second binary within a second region of the memory, the second binary being separate from the first binary and implementing, a network stack that is restricted to communicate only with a set of trusted servers identified based on certificate, and a second set of networking functions defined by OSI layer 3, OSI layer 4, OSI layer 5, OSI layer 6, and OSI layer 7; and prevent the second binary from accessing the first region of the memory.

19. The processor-readable storage medium of claim 18, wherein:

the set of trusted servers is identified based on certificate; and the network stack identifies a trusted server using a certificate-based authenticating protocol.

20. The processor-readable storage medium of claim 18, wherein one of a memory management unit (MMU) or a memory protection unit (MPU) protects the first region of the memory from the second region of the memory.

* * * * *